United States Patent Office 2,703,816
Patented Mar. 8, 1955

2,703,816

ORGANIC PEROXIDES

William S. Emerson and Bernard S. Wildi, Dayton, Ohio, assignors to Monsanto Chemical Company, St. Louis, Mo., a corporation of Delaware No Drawing. Application September 26, 1951,
Serial No. 248,460

8 Claims. (Cl. 260—584)

This invention relates to organic peroxides and more particularly provides certain new aminoalkyl peroxides and methods of producing the same.

An object of the invention is the preparation of new and useful organic peroxides. Another object of the invention is the preparation of organic peroxides possessing increased stability. Still another object of the invention is the provision of basically reacting organic peroxides. A further object of the invention is the preparation of 2-aminoalkyl peroxides by the addition reaction of certain organic hydroperoxides with certain aziridine compounds.

These and other objects which will be hereinafter apparent are provided by the following invention wherein there are prepared β-aminoalkyl peroxides having the formula

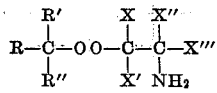

in which R, R' and R'' are selected from the class consisting of hydrogen, and alkyl, aryl, alkaryl, aralkyl, and cycloalkyl radicals of from 1 to 12 carbon atoms, and in which the total number of carbon atoms in R, R' and R'' is at least 3 but less than 20; and X, X', X'' and X''' are selected from the class consisting of hydrogen and alkyl radicals of from 1 to 3 carbon atoms.

Compounds having the above formula are readily prepared by the addition reaction of certain hydrocarbon hydroperoxides of from 4 to 20 carbon atoms and cyclic imines selected from the class consisting of aziridine (ethyleneimine) and 2- and/or 3-alkyl-substituted aziridines in which each alkyl radical has from 1 to 3 carbon atoms.

Organic hydroperoxides which may be employed for the preparation of the present 2-aminoalkyl peroxides are hydrocarbon hydroperoxides generally. When R, R' and R'' in the above formulae are hydrogen or alkyl radicals or cycloalkyl radicals, the useful hydroperoxides are, e. g., the alkane hydroperoxides such as propane hydroperoxide, n-octane hydroperoxide, iso-hexane hydroperoxide, tert-butyl hydroperoxide, tert-amyl hydroperoxide, isopentane hydroperoxide, cyclohexane hydroperoxide, cyclopentane hydroperoxide, methylcyclohexane hydroperoxide, decalin hydroperoxide, tetralin hydroperoxide, etc. Amino peroxides prepared by the present process from the tert-alkyl peroxides and the present aziridines may be described as tert-alkyl 2-aminoalkyl peroxides of from 5 to 33 carbon atoms. When at least one of R, R' and R'' is an aryl radical, the useful hydroperoxides include toluene hydroperoxide, diphenylmethyl hydroperoxide, triphenylmethyl hydroperoxide, trinaphthylmethyl hydroperoxide, etc. R, R' and R'' in the above formulae may be dissimilar. When R is an aryl or alkaryl radical and R' and R'' are alkyl, the useful compounds include cumene hydroperoxide, cymene hydroperoxide, α-phenylethyl hydroperoxide, etc.

Aziridine compounds used for reaction with the organic hydroperoxides to yield the present 2-aminoalkyl peroxides include aziridine, 2-methylaziridine, 2-ethylaziridine, 2,2-dimethylaziridine, 2,3-dimethylaziridine, 2-propylaziridine, 2,2-dimethyl-3-propylaziridine, 2,2,3-trimethyl-3-propylaziridine, etc. The useful aziridines are readily obtainable by the dehydrating ring-closure of 2-aminoalkanols, 2-methylaziridine, for example, being prepared from isopropanolamine.

Reaction of the hydroperoxide with the aziridine compound to yield the present 2-aminoalkyl peroxides occurs by simply adding the one reactant to the other and allowing the resulting mixture to stand at ordinary or moderately elevated temperatures until formation of the peroxides has taken place. Generally, the use of temperatures of up to, say, 80° C. is preferred. The reaction product obtained from the mixture of hydrocarbon hydroperoxide and aziridine compound is generally a mixture of isomeric 2-aminoalkyl peroxides, together with any unreacted material. After separating the unreacted material, e. g., by fractional distillation or solvent extraction, the residue usually consists of a mixture of the isomeric compounds which are formed according to the schemes:

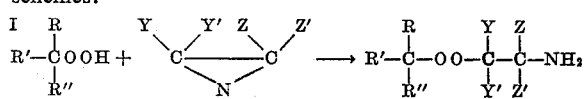

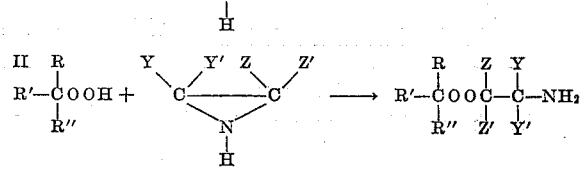

in which Y, Y', Z and Z' are selected from the class consisting of hydrogen and alkyl radicals of from 1 to 3 carbon atoms.

The formation of both isomers in the addition reaction is probably due to the opening of the aziridine ring at either of the ring carbon atoms. The quantity of each isomer in the reaction product varies with the individual aziridine compound employed as well as with the reaction conditions used. Symmetrical aziridines, e. g., ethyleneimine or 2,2-dimethyl-aziridine, of course, yield only the single peroxide. When a mixture of isomers is formed, it may be resolved by repeated distillations and/or extractions. In most instances, however, the isolation steps may be dispensed with, and the isomeric mixtures employed as such for a wide variety of industrial purposes. The usefulness of the present peroxides depends to a great extent on the presence of the amino group in the 2-position, and since both isomers are characterized by this feature, there is generally little practical need for separating the two.

2-aminoalkyl peroxides provided by the present invention include tert-butyl 2-aminoethyl peroxide from tert-butyl hydroperoxide and ethyleneimine; cumyl 2-aminoethyl peroxide from cumene hydroperoxide and ethyleneimine; tert-butyl 2-aminobutyl peroxide and tert-butyl 1-ethyl-2-aminoethyl peroxide from tert-butyl hydroperoxide and 2-ethylaziridine; 1-phenylethyl 1-methyl-2-aminopropyl peroxide from α-methylbenzyl hydroperoxide and 2,3-dimethylaziridine; n-propyl 1-ethyl-2-aminobutyl peroxide from propyl hydroperoxide and 2,3-diethylaziridine, cyclohexyl 2-aminoamyl peroxide and cyclohexyl 1-propyl-2-aminoethyl peroxide from cyclohexyl hydroperoxide and 2-propylaziridine; diphenylmethyl 1,1-dimethyl-2-aminoamyl peroxide and diphenylmethyl 1-propyl-2,2-dimethyl-2-aminoethyl peroxide from diphenylmethane hydroperoxide and 2,2-dimethyl-3-propylaziridine.

Since formation of the present 2-aminoalkyl peroxides takes place by addition of one mole of the aziridine compound to one mole of the hydrocarbon hydroperoxide, equimolar quantities of the reactants are advantageously employed. However, since any excess of either the hydroperoxide or the aziridine may be readily recovered from the final product, the proportion of each initial reactant is immaterial.

The present 2-aminoalkyl peroxides range from clear, viscous liquids, to waxy or crystalline solids. Compounds which are derived from lower alkyl hydroperoxides and the aziridines are generally water-soluble, and hence are advantageously employed as catalysts in polymerizations which are effected in aqueous media. As basically reacting materials, the present β-amino-substituted peroxides contribute to the suppression of color-formation in polymerizations involving such basic monomers as acrylonitrile, wherein the presence of acidic materials often leads to products of poor color. The present 2-aminoalkyl peroxides are also advantageously employed as polymerization catalysts in Redox systems, the improved stability of the present peroxides permitting the use of highly active reducing agents in the systems.

The invention is further illustrated, but not limited, by the following examples:

Example 1

To 36 g. of 2-methylaziridine there was added dropwise, at a temperature of 50° C., 57 g. of tert-butyl hydroperoxide. The resulting mixture was maintained for 24 hours at a temperature of 65° C., and then distilled under partial vacuum to yield a fraction B. P. 57–64° C./20 mm., which upon two redistillations gave a fraction, B. P. 57–8° C./13 mm., comprising a mixture of tert-butyl 2-aminopropyl peroxide and the isomeric tert-butyl 1-methyl-2-aminoethyl peroxide, and analyzing as follows:

|  | Found | Calcd. for $C_6H_{17}O_2N$ |
|---|---|---|
| Percent C | 57.64 | 57.11 |
| Percent H | 11.80 | 11.64 |

Example 2

The mixture of isomeric peroxides prepared in Example 1 was tested as a polymerizing catalyst as follows:

A bottle containing 7 g. of acrylonitrile, 3 g. of vinyl acetate, 100 ml. of water, 0.005 g. of sulfur dioxide and 0.0951 g. of the mixture of peroxides of Example 1 was placed on a rotating rack and maintained there for 2 hours at a temperature of 50° C. The solid copolymer which was formed was then tested for heat-stability by submitting it to aging for 3 hours at a temperature of 180° C. Under these conditions the copolymer showed substantially no discoloration, whereas similar copolymers prepared in the presence of other peroxidic catalysts, e. g., potassium persulfate, or tert-butyl hydroperoxide, were not color-stable at such temperature conditions.

The peroxidic product of Example 1 may be employed with similar advantage as a polymerizing catalyst for acrylonitrile alone, or for mixtures of acrylonitrile and other monomers copolymerizable therewith, e. g., butadiene methyl methacrylate, styrene, vinyl chloride, etc. The very good results obtained with the 2-aminoalkyl peroxides is surprising, for in prior art amino compounds have been generally regarded as detrimental in polymerizing systems comprising acrylonitrile.

While the present 2-aminoalkyl peroxides are very advantageously employed as polymerizing catalysts for acrylonitrile, they are also useful in the formulation of explosives and rocket-propellants, as bleaching agents for cereal flours and cellulosic fibers, as household deodorants, as chemical intermediates, etc.

What I claim is:

1. Organic peroxides having the formula

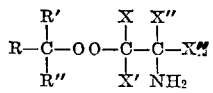

in which R, R' and R" are selected from the class consisting of hydrogen and alkyl, aryl, alkaryl, aralkyl and cycloalkyl radicals, each of said radicals having from 1 to 12 carbon atoms and in which the total number of carbon atoms in R, R' and R" is from 3 to 19; and X, X', X" and X'" are selected from the class consisting of hydrogen and alkyl radicals of from 1 to 3 carbon atoms.

2. Tert-butyl 2-aminopropyl peroxide.

3. Tert-butyl 1-methyl-2-aminoethyl peroxide.

4. A mixture of tert-butyl-2-aminopropyl peroxide and tert-butyl 1-methyl-2-aminoethyl peroxide.

5. The method which comprises contacting organic hydroperoxides of the formula

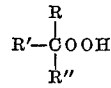

in which R, R' and R" are selected from the class consisting of hydrogen and alkyl, aryl, alkaryl, aralkyl and cycloalkyl radicals, each of said radicals having from 1 to 12 carbon atoms and in which the total number of carbon atoms in R, R' and R" is from 3 to 19; with aziridine compounds having the formula

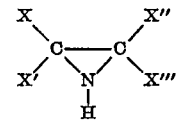

in which X, X', X" and X'" are selected from the class consisting of hydrogen and alkyl radicals of from 1 to 3 carbon atoms, and recovering from the resulting reaction product 2-aminoalkyl peroxides having the formula

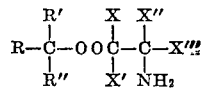

in which R, R' and R" are selected from the class consisting of hydrogen and alkyl, aryl, alkaryl, aralkyl and cycloalkyl radicals, each of said radicals having from 1 to 12 carbon atoms and in which the total number of carbon atoms in R, R' and R" is from 3 to 19; and X, X', X" and X'" are selected from the class consisting of hydrogen and alkyl radicals of from 1 to 3 carbon atoms.

6. The method which comprises contacting tert-butyl hydroperoxide with 2-methylaziridine and recovering tert-butyl 2-aminopropyl peroxide from the resulting reaction product.

7. The method which comprises contacting tert-butyl hydroperoxide with 2-methylaziridine and recovering tert-butyl 1-methyl-2-aminoethyl peroxide from the resulting reaction product.

8. The method which comprises contacting tert-butyl hydroperoxide with 2-methylaziridine and recovering from the resulting reaction product a mixture of tert-butyl 2-aminopropyl peroxide and tert-butyl 1-methyl-2-aminoethyl peroxide.

References Cited in the file of this patent

UNITED STATES PATENTS

| 2,485,277 | Gilbert | Oct. 18, 1949 |
| 2,511,476 | Loder et al. | June 13, 1950 |
| 2,519,135 | Jacobson | Aug. 15, 1950 |
| 2,520,093 | Gross | Aug. 22, 1950 |